Patented Aug. 3, 1937

2,088,651

UNITED STATES PATENT OFFICE 2,088,651

INSECTICIDE

Arthur H. Henninger, St. Albans, N. Y., assignor to General Chemical Company, New York, N. Y., a corporation of New York No Drawing. Application August 9, 1933, Serial No. 684,400

15 Claims. (Cl. 167—15)

The present invention relates to insecticides, and is more particularly directed to improvements in insecticides used in the field as sprays for the treatment of plants generally, fruits in particular, and soils.

Various arsenicals such as Paris green, calcium arsenate, lead arsenate, zinc arsenite and ferric arsenate have been employed, or their use suggested, either in powdered form or in water suspension for controlling insect pests. The present invention is concerned particularly with arsenicals, such as lead arsenate, which are applied by making up a water suspension and distributing the arsenical in the form of a spray on foliage or produce. Because of the method of manufacture, arsenicals are usually available in finely divided condition, and moreover are substantially insoluble in water. After spraying, the water utilized in forming the suspension evaporates, leaving the arsenical more or less distributed over the surfaces of foliage and produce. In order to get reasonably uniform distribution of the arsenical, it is of primary importance to initially form a satisfactory suspension of the arsenical in water. Ordinary arsenicals, such as lead arsenate, while suspensible to some extent in water, settle rapidly, and hence it is difficult to keep the arsenical in suspension during application without constant agitation of the spray solution while in the spraying apparatus, and even then poor distribution of the arsenical on the foliage and produce is often obtained. To overcome the tendency of well known commercial arsenicals to settle out of the spray solution during application in the field, deflocculating agents of various kinds have been employed in conjunction with the arsenicals to produce insecticidal compositions which may be easily suspended in water, and which remain in suspension for a period of time sufficient to permit satisfactory spraying.

One of the principal objects of the invention is the provision of insecticidal compositions comprising particularly arsenicals, such as lead arsenate, which are readily suspensible in water and which remain in suspension during spraying under conditions usually encountered in practice. The invention further aims to provide a method for incorporating the deflocculating agent with an arsenical, such as lead arsenate, without interfering with the steps of the process usually employed for making the arsenical.

With such objects in view, the invention comprises principally improvements in insecticidal products having incorporated therewith deflocculating or dispersing agents which materially increase the suspensibility of the insecticides in water. The invention further comprehends methods for making the improved products. In accordance with the invention, it has been found that dyestuff materials, such as hereinafter noted, are effective deflocculating agents for insecticides, especially arsenicals. Hence, the invention particularly comprises arsenical insecticides, especially lead arsenate, having dyestuffs incorporated therewith.

The dyes used in the preferred embodiments of the invention are water soluble dyes of the polyazo, stilbene, and thiazine classes. In making the insecticides of the invention, a water solution of the particular dye employed is added to a water slurry of the arsenical. If the arsenical such as lead arsenate, is already in the dry state, a water slurry may be formed, and the dye, in proper amounts, made up in the water solution and added to the slurry. The lead arsenate slurry is then evaporated to dryness, and the dye deflocculating material is evenly distributed throughout the dry lead arsenate. An arsenical such as lead arsenate is customarily manufactured by reacting lead oxide and arsenic acid, the lead arsenate forming an insoluble precipitate. In usual methods for manufacturing lead arsenate, the water slurry containing the lead arsenate is evaporated to dryness, and the lead arsenate is obtained in finely divided form. When making the improved insecticides in accordance with the method of the invention, a water solution of the dye material may be added to the lead arsenate slurry, subsequent to precipitation of the lead arsenate, but before the slurry is evaporated to dryness. By proceeding in this manner, the deflocculating material may be incorporated in the lead arsenate without interfering with the usual steps employed in the manufacture of the lead arsenate, and without further additional steps other than making up of the dye solution and introducing the same into the lead arsenate slurry prior to the drying.

It has been found more particularly that water soluble dyes, containing an acid solubilizing group, preferably a sulfonic acid group, and including polyazo dyes, and stilbene dyes containing a sulfonic acid group and especially those containing more than one azo group, have good deflocculating properties especially with respect to lead arsenate. Thus, it has been found that water soluble dyes containing a sulfonic acid group which are members of the classes of disazo dyes and stilbene azo dyes are especially adaptable for the purposes of the invention. In the following specific examples, the dyes were incorporated with the lead arsenate in about the proportions of 4.5 lbs. of dyestuff per ton of dry lead arsenate. The quantity of dye material employed was made up in a water solution, and added to the lead arsenate slurry, prior to drying. The following examples indicate the arsenical, the dyestuff, the group of the latter, and the per cent suspensibility of the several products, and also for comparison, the suspensibility of a standard lead arsenate having no dye material incorporated therewith:

|   | Arsenical | Dye | Group | Percent suspended |
|---|---|---|---|---|
| 1 | Lead arsenate | Erie fast scarlet 4BA. | Tertiary disazo. | 76 |
| 2 | Lead arsenate | Erie fast scarlet 8BA. | Tertiary disazo. | 67 |
| 3 | Lead arsenate | Erie fast scarlet YA. | Tertiary disazo. | 70 |
| 4 | Lead arsenate | Erie fast orange A. | Tertiary disazo. | 38 |
| 5 | Lead arsenate | Erie violet 2—B | Disazo | 52 |
| 6 | Lead arsenate | Erie yellow S2G | Stilbene | 56 |
| 7 | Lead arsenate | Orange B—25451 | Mixture | 58 |
| 8 | Lead arsenate | | | 21 |

Example 7 is a 2:1 mixture of Erie yellow S2G, stilbene group, and Erie fast scarlet 4BA, tertiary disazo group. When using dyes of the groups noted above, the quantity of dye material incorporated may vary from about 0.1 pound to 20 pounds per ton of arsenical (dry basis).

Thiazine dyes may also be employed. With dyes of this type, it is preferred to use in conjunction therewith mordants such as tannic acid to fix the deflocculating material to the arsenical. As in the procedure set forth above, methylene blue and tannic acid may be added in the water solution to the lead arsenate slurry before the latter is evaporated to dryness. By using a combination of a thiazine dye, such as methylene blue, and tannic acid, the suspension value may be raised to around 65. In one particular example, where methylene blue and tannic acid were incorporated with lead arsenate in the proportions of 0.66 lb. of methylene blue and 2 lbs. of tannic acid per ton of lead arsenate (dry basis), the suspensibility of the resulting product was 64%. The lead arsenate from which the product was made had a suspensibility of only 19%.

Dyes of this class, such as methylene blue, materially increase the suspensibility of the lead arsenate even when employed without a mordant such as tannic acid. In one example, where methylene blue alone was incorporated with lead arsenate in the proportions of 6.6 lbs. of methylene blue to one ton of lead arsenate (dry basis), the suspensibility of the lead arsenate was 34% as compared with a suspensibility of 19% where lead arsenate alone without a dye material was suspended in water. It is preferred, however, when employing dyes such as those of the thiazine group, to use a mordant in conjunction therewith to fix the dye to the lead arsenate and obtain more satisfactory results. The amount of dye material of the thiazine group, such as methylene blue, may range from about 0.1 pound to about 20 pounds per ton of arsenical, and the quantity of mordant material may range from about 0.1 pound to about 20 pounds per ton of arsenical on the dry basis.

The suspensibility test employed in determining the above percentages of suspended material is known in the art and may be briefly described as follows: A 1.2 gram sample of arsenate of lead is suspended, by vigorous agitation, in 500 cc. of water in a graduated cylinder having a diameter of about 50 mm. (This corresponds to a spray solution containing 1 lb. of arsenate of lead to 50 gallons of water.) The suspension is allowed to stand for 5 minutes, after which the upper half of the liquid is drawn off quickly into a dish and then evaporated down to determine the weight of the arsenical residue. The obtained figure expressed in percentage based on one-half of the original sample gives a percentage of arsenate of lead remaining in suspension in the upper half of the liquid, and is the result indicated in the above tests as being the percentage of material remaining suspended in the liquid.

Poisonous salts, such as lead arsenate, are widely used as insecticides for agricultural purposes, and are quite likely to fall into the hands of uninformed persons. These materials are ordinarily sold in the form of white powders which cannot be readily identified merely by appearance from other similar non-poisonous substances such as flour, and baking powder. It is to be observed that the products of the present invention are all colored materials and hence will not be mistaken for non-harmful powders of similar appearance. Accordingly, an incidental advantage of the invention is that in addition to producing products of improved suspensibility in water, the insecticidal compositions are colored, which feature aids in identification.

I claim:

1. An insecticide comprising a water insoluble arsenate having incorporated therewith a relatively small amount of a dispersing agent consisting of a water soluble dye selected from the group consisting of polyazo dyes containing an acid solubilizing group, thiazine and stilbene dyes.

2. An insecticide comprising a water insoluble arsenate having incorporated therewith a relatively small amount of a dispersing agent consisting of a water soluble polyazo dye containing an acid solubilizing group.

3. An insecticide comprising a water insoluble arsenate having incorporated therewith a relatively small amount of a dispersing agent consisting of a polyazo dye containing a sulfonic acid group.

4. An insecticide comprising a water insoluble arsenate having incorporated therewith a relatively small amount of a dispersing agent consisting of a disazo dye containing a sulfonic acid group.

5. An insecticide comprising a water insoluble arsenate having incorporated therewith a relatively small amount of a dispersing agent consisting of a water soluble tertiary disazo dye containing a sulfonic acid group.

6. An insecticide comprising lead arsenate having incorporated therewith a relatively small amount of a dispersing agent consisting of a water soluble dye selected from the group consisting of polyazo dyes containing an acid solubilizing group, thiazine and stilbene dyes.

7. An insecticide comprising lead arsenate having incorporated therewith a relatively small amount of a dispersing agent consisting of a water soluble polyazo dye containing an acid solubilizing group.

8. An insecticide comprising lead arsenate having incorporated therewith a relatively small amount of a dispersing agent consisting of a disazo dye containing a sulfonic acid group.

9. An insecticide comprising lead arsenate having incorporated therewith a relatively small amount of a dispersing agent consisting of a water soluble thiazine dye.

10. An insecticide comprising lead arsenate having incorporated therewith a relatively small amount of a dispersing agent consisting of methylene blue.

11. An insecticide comprising lead arsenate having incorporated therewith not less than about 0.1 pound and not more than about 20 pounds per ton of lead arsenate, of a dispersing agent consisting of a water soluble dye selected from the group consisting of polyazo dyes containing an acid solubilizing group, thiazine and stilbene dyes.

12. An insecticide comprising lead arsenate having incorporated therewith not less than about 0.1 pound and not more than about 20 pounds per ton of lead arsenate, of a dispersing agent consisting of a water soluble disazo dye containing an acid solubilizing group.

13. An insecticide comprising lead arsenate having incorporated therewith a relatively small amount of a dispersing agent consisting of a water soluble thiazine dye and a mordant.

14. An insecticide comprising lead arsenate having incorporated therewith a relatively small amount of a dispersing agent consisting of methylene blue and a mordant.

15. An insecticide comprising lead arsenate having incorporated therewith a relatively small amount of a dispersing agent consisting of methylene blue and tannic acid.

ARTHUR H. HENNINGER.